United States Patent [19]

Leclerc

[11] Patent Number: 4,760,864

[45] Date of Patent: Aug. 2, 1988

[54] DEVICES FORMING PARTS OF REGULATORY SYSTEMS FOR PROVIDING AN OUTPUT IN THE FORM OF RECTILINEAR MOTION WITH AN INPUT OF BOTH ROTARY AND RECTILINEAR MOTION

[75] Inventor: Henry R. Leclerc, Juvisy sur Orge, France

[73] Assignee: Societe Nationale D'Etude et de Construction de Moteurs D'Aviation "S. N. E. C. M. A.", Paris, France

[21] Appl. No.: 12,485

[22] Filed: Feb. 9, 1987

[30] Foreign Application Priority Data

Feb. 19, 1986 [FR] France ............................. 86 02220

[51] Int. Cl.$^4$ .................... F16K 37/00; F16K 31/122
[52] U.S. Cl. ................................. 137/552; 137/554; 251/31; 74/25
[58] Field of Search ................ 137/554, 552; 251/31, 251/86, 264; 74/25; 340/870.35, 870.36

[56] References Cited

U.S. PATENT DOCUMENTS

| | | | |
|---|---|---|---|
| 661,712 | 11/1900 | Cederstrom | 251/86 |
| 2,321,780 | 6/1943 | Tondeur | 75/25 X |
| 2,964,287 | 12/1960 | Farkas | 251/31 |
| 3,356,335 | 12/1967 | Koch et al. | 251/264 |
| 3,405,244 | 10/1968 | Collins | |
| 3,447,774 | 6/1969 | Webb | 251/31 |
| 3,688,495 | 9/1972 | Fehler et al. | |
| 3,850,196 | 11/1974 | Fales | 137/554 |
| 3,930,415 | 1/1976 | Hoganson | 75/25 X |
| 4,216,795 | 8/1980 | Cobb et al. | 137/554 |
| 4,690,168 | 9/1987 | Kihm | 137/554 |

FOREIGN PATENT DOCUMENTS 51961  5/1982 European Pat. Off. .
2227474 11/1974 France .

Primary Examiner—John Rivell
Attorney, Agent, or Firm—Oblon, Fisher, Spivak, McClelland & Maier

[57] ABSTRACT

A device for transmitting simultaneously to two parallel rods a motion with a single degree of freedom as a longitudinal translational motion from a sleeve surrounding the rods and which is itself subject to first and second degrees of freedom, a translational and a rotary motion, which includes a plate interconnecting the ends of the parallel rods, the plate lying perpendicularly to the axis of translational motion of the rods, and a connecting mechanism between the plate and the sleeve such that the connecting mechanism is adapted for transmitting only the translational motion to the plate.

8 Claims, 1 Drawing Sheet

DEVICES FORMING PARTS OF REGULATORY SYSTEMS FOR PROVIDING AN OUTPUT IN THE FORM OF RECTILINEAR MOTION WITH AN INPUT OF BOTH ROTARY AND RECTILINEAR MOTION

BACKGROUND OF THE INVENTION

1. Field of the Invention

This invention relates to devices enabling the transmission, as an output, of a translational motion only while the input motion can be considered as a double motion of both translation and of rotation and relates, more particularly to devices enabling the transmission to a sensor of an instruction relating to the displacement in translation of a movable member with the exception of possible rotational movements of the movable member which are to be transmitted to the sensor as a measurement of the displacement in translation.

2. Description of the Prior Art

This problem may be encountered in numerous control systems but the invention has a particular relationship to the case where the movable member at the input of the device is a cylindrical sleeve displaced by a fluid and subject to no guidance in translation motions, which may cause it to be subjected to rotational motion, while the output device is constituted by two mutually parallel rods which are movable in translation in fixed supports disposed at the outside of the sleeve and for these reasons the rods are not required to undergo any rotation whatsoever during their translational motion.

The invention can be applied to fuel dispensing pistons in engine fuel control units, for example for turbo machines. Within this sphere of activity, devices of the preceding generation were wholly hydraulic and the problem now encountered did not arise. Since then, the tendency of engine manufacturers has been to make the devices electro-hydraulic, the control as such being wholly electronic and an electro-hydraulic interface enables either the control of the hydraulic parts, or of the transmission of electrical signals derived from hydraulic elements. Amongst the signals which may be encountered are pressure signals, flow signals displacement signals, etc. . . . and the invention here described, concerns a fuel dispensing piston, the variation in the linear location of the piston enabling knowledge at any given instant of the quantity of fuel being delivered to the engine fuel injectors.

The present day tendency for the manufacturer of control units is to make the electronic part of the control predominant and extends to giving complete authority to the electronic control computers. So that the viability of the latter cannot be subject to default, coupling systems are provided such that during operation there is a degree of redundancy. Similarly, measurements are effected in parallel so that even if the sensors were non-usable for any reason whatsoever, the required signal will nevertheless be transmitted to the computer by the other sensor.

Such a device is described in U.S. Pat. No. 3,688,495 where the displacement of a pointer is measured by a soft iron core controlled by two induction windings disposed in an extension of the one from the other and actuated either alternatively or simultaneously in a differential manner.

This type of device has the disadvantage of requiring substantial axial space.

Other types of twin detectors are also known in which a detectoor is located at one side of a slide valve of which the displacement is measured and the other detector on the opposite side of the slide valve, which, however, gives rise to the same disadvantage of substantial space usage.

SUMMARY OF THE INVENTION

In order to resolve this problem it is proposed in accordance with the present invention to dispose the two displacement sensors side-by-side and in a single block. In this case, the rods of each of the sensors are no longer found to be disposed on the longitudinal axis of displacement of the slide valve and the induction windings within the interior of which they must be displaced without friction being fixed, the rods of the sensors must be insensitive to any possible rotational movement of the slide valve to which they are connected, which would otherwise give rise to non-alignment of the rods with respect to the windings, and thus friction and poor operation of the sensors.

The invention thus has as its object to avoid this disadvantage while at the same time proposing a simple sensor device with redundancy, but be compact, and inexpensive.

The invention also has as its object to produce such an arrangement, while avoiding the supplementary use of an anti-rotation system of the slide valve, which arrangement will be neither bulky nor costly.

According to the present invention there is provided in a device for transmitting simultaneously to two parallel rods a motion with a single degree of freedom as a longitudinal translational motion from a sleeve surrounding the rods and which is itself subject to two degrees of freedom, a translational and a rotary motion, the improvement comprising a plate interconnecting the ends of the parallel rods, the plate lying perpendicularly to the axis of translational motion of the rods, and connecting means between the plate and the sleeve such that the connecting means are capable of transmitting only the translational motion to the plate.

According to one preferred feature in accordance with the invention, the connection means between the plate and the sleeve is constituted by a ball bearing, or a ball stop of which the internal ring is disposed on a circular carrier of the plate for interconnection between an abutment and a mounting plate and of which the outer ring co-operates with a cylindrical internal seating of the sleeve.

Resilient means for taking up the axial play of the connecting means can be disposed between the plate and the sleeve.

When the invention is applied to a fuel dispensing piston of a control device for the fuel supply to a turbo machine, the sleeve may be constituted by the dispensor itself.

BRIEF DESCRIPTION OF THE DRAWING

The sole FIGURE illustrates a device in accordance with the invention applied to a fuel dispensing piston of a fuel control unit of a turbo machine.

DESCRIPTION OF THE PREFERRED EMBODIMENT

Figure 1:
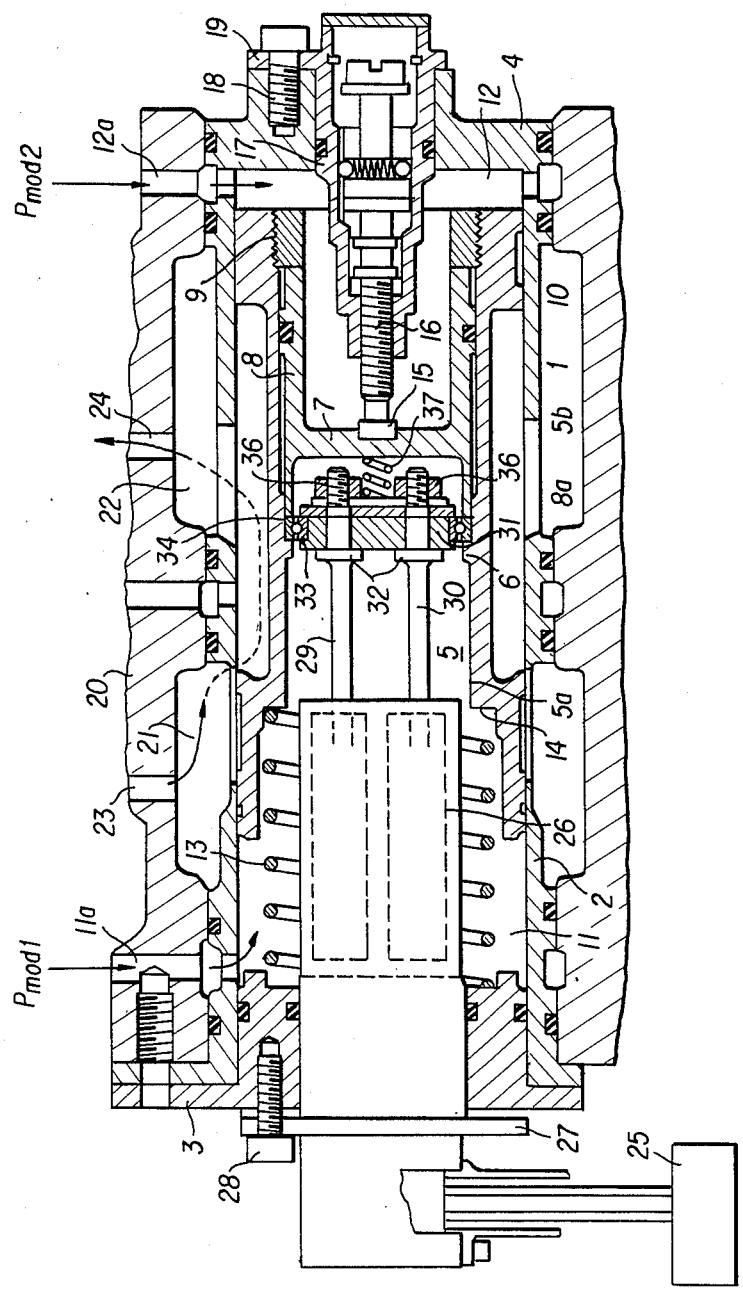

The fuel dispenser comprises a sleeve 1 of generally cylindrical shape, capable of being displaced rotationally and in translation i.e. rectilinear motion along its longitudinal axis within an outer cylinder 2 closed at its two opposite ends by respective caps 3 and 4. The sleeve 1 has a central bore 5 divided into two sections 5a and 5b separated by a internal annular abutment 6. The sleeve 1 is rigid with a piston 7 of which a cylindrical skirt 8 is adjustable within the bore 5b and has at one end an internal screw thread 9 in order to receive an external screw threaded ring 10 to provide the rigid connection of the piston assembly 7-8 and the sleeve 1.

Two chambers are defined, one on each side of the piston 7, one chamber 11 being defined by the cap 3, the end portion of the sleeve 1 and an end portion of the cylinder 2, the other chamber, 12, being defined by the cap 4, the other end portion of the sleeve 1 and the other end portion of the cylinder 2.

The two chambers 11 and 12 are supplied through communicating openings 11a and 12a of the cylinder 2 with fluid respectively at the pressure Pmod1 and Pmod2 and the piston 7 rigid with the sleeve 1 is displaceable under the differential action of fluids at pressures Pmod1 and Pmod2.

A spring 13 located within the chamber 11 between the cap 3 and an internal shoulder 14 of the bore 5a of the sleeve 1, acts to bias the latter towards an abutment 15 adjustable by a screw 16 displaceable within a recessed member 17 transversely screw threaded in a fluidtight manner in the cap 4 to which it is secured by screws 18 passing through tabs 19 of the recessed member 17.

The cylinder 2 is disposed within a casing 20 (shown only in outline) in which are machined two annular chambers 21, 22, the first, 21, being supplied through a passage 23 of the casing by a volumetric or centrifugal pump while the second chamber 22 comprises an outlet 24 to the injectors of the engine controlled by the regulating device. The passage of part of the fluid from the supply chamber 21 to the output chamber 22 is effected in a known manner which will not be described in detail herein such that the variation in flow at the outlet is proportional to the axial displacement of the piston and thus of the sleeve 1.

Signals relating to the motion of the sleeve 1 are transmitted to an external control means, for example an electronic computer, by two linear induction sensors arranged electrically in parallel and simultaneously receiving the displacement measurement, relayed electrically to a main connector 25 of the control system.

The two sensors are disposed parallel to one another in a cylindrical member 26 disposed within the chamber 11, the cylindrical member 26 passing through in a fluidtight manner an axial bore of the cap 3 to which it is secured by a flange 27 screwed at 28 on the cap.

Rods 29, 30 of the two sensors lie in a common plane, symetrically with respect to the longitudinal axis of the device and slidable within induction windings of each sensor, the windings (illustrated in broken lines) being contained within the cylindrical hollow member 26.

In order to receive simultaneously the displacement measurement signal of the sleeve 1 without the signal being disturbed by rotation of the sleeve, the two rods 29, 30 are made rigid with one another by a circular plate 31 in contact against shoulders 32 of each of the rods, the plate comprising two bores symetrically disposed with respect to the longitudinal axis of the sleeve.

The plate 31 comprises a shoulder 33 against which the inner race of a ball bearing 34 is applied and is held in position by a bearing plate 35. The plate 31 as well as the plate 35 are secured against the shoulders 32 by nuts 36 screwed onto the screw threaded ends of the rods 29, 30.

The outer race of the bearing 34 abuts with the cylindrical internal seating 6 of the sleeve 1 between the shoulder 6 of the latter and the annular end 8a of the piston 7.

In order to avoid defects in measurement due to clearances inherent in the manufacture of bearings and outer parts, resilient means for taking up clearance in the axial sense is provided and takes the form of a spring 37, compressed between the connecting plate 31 and one face of the piston 7.

Thus, during axial displacement of the assembly of the dispensing sleeve 1 and of the piston 7, which is not prevented from rotating, possible rotation of this assembly will not drive in rotation anything except the outer race of the bearing 34 while the degree of freedom will be transmitted to the inner race of the bearing without affecting the angular position of the connecting plate and a fortiori of the rods 29, 30 of the sensors, the sole degree of freedom transmitted to the two sensors being the translation of the device, that is to say, of the dispensing sleeve and of the piston.

As is it possible to see, the invention is applicable not only to linear sensors, of which one is redundant, applied to a controlling dispenser, but also to any axial drive device where a parasitic rotation of an input member should not be transmitted to output members which are intended only to move axially.

When the invention is applied to regulators of turbo machines, it gives rise to a substantial reduction in mass, as well as bulk since the sensor and its connecting means are located within the interior of the dispensing sleeve, which reduces the cost of manufacture, whilst at the same time improving the viability of the regulation.

Obviously, numerous modifications and variations of the present invention are possible in light of the above teachings. It is therefore to be understood that within the scope of the appended claims, the invention may be practiced otherwise than as specifically described herein.

What is claimed is:

1. In a device for transmitting simultaneously to two parallel rods a motion with a single degree of freedom as a longitudinal translational motion from a sleeve surrounding the rods and which is itself subject to two degrees of freedom, a translational and a rotary motion, the improvement comprising:
    a plate interconnecting the ends of the parallel rods, the plate lying perpendicularly to the axis of translational motion of the rods, and
    connecting means between the plate and the sleeve such that the connecting means are capable of transmitting only the translational motion to the plate, wherein the connecting means between the plate and the sleeve comprises a ball bearing having an inner race and an outer race, the connecting plate having an annular seating between a shoulder and a holding plate or washer, the internal race of the ball bearing being in abutment against the circular seating and the outer race cooperating with an internal cylindrical abutment of the sleeve.

2. In a device for transmitting simultaneously to two parallel rods a motion with a single degree of freedom as a longitudinal translational motion from a sleeve surrounding the rods and which is itself subject to two degrees of freedom, a translational and a rotary motion, the improvement comprising:

a plate interconnecting the ends of the parallel rods, the plate lying perpendicularly to the axis of translational motion of the rods, and connecting means between the plate and the sleeve such that the connecting means are capable of transmitting only the translational motion to the plate; and resilient means lying between the connecting plate and the sleeve, the resilient means serving to take up axial clearances of the connecting means.

3. A device according to claim 2, wherein the resilient means comprises a spring maintained in compression between the plate and a piston rigid with the sleeve during its axial displacements.

4. A device according to claim 3, wherein the translational motion of the sleeve is controlled by first and second hydraulic pressures respectively acting on first and second faces of the piston.

5. In a device for transmitting simultaneously to two parallel rods a motion with a single degree of freedom as a longitudinal translational motion from a sleeve surrounding the rods and which is itself subject to two degrees of freedom, a translational and a rotary motion, the improvement comprising:

a plate interconnecting the ends of the parallel rods, the plate lying perpendicularly to the axis of translational motion of the rods, and connecting means between the plate and the sleeve such that the connecting means are capable of transmitting only the translational motion to the plate, wherein the sleeve forms a fuel dispenser of a fuel control regulator of a turbo-machine, the dispenser being movable in translation and in rotation within an outer fixed cylinder.

6. A device according to claim 5, wherein the two rods are constituted by rods of two position sensors for redundant measurement of the translational motion of the fuel dispenser.

7. A device according to claim 6, wherein the two sensors are disposed parallel to one another within a single casing rigid with the outer cylinder, the casing being itself located within the sleeve dispenser.

8. A device according to claim 6, wherein the position sensors comprise induction linear sensors of which induction windings disposed within a casing are electrically connected to a principal connector of the regulator.

* * * * *